United States Patent [19]

Perez

[11] Patent Number: 5,319,777

[45] Date of Patent: Jun. 7, 1994

[54] SYSTEM AND METHOD FOR STORING AND RETRIEVING INFORMATION FROM A MULTIDIMENSIONAL ARRAY

[75] Inventor: Manuel Perez, Berkeley Heights, N.J.

[73] Assignee: Sinper Corporation, Warren, N.J.

[21] Appl. No.: 598,373

[22] Filed: Oct. 16, 1990

[51] Int. Cl.$^5$ .............................................. G06F 15/40
[52] U.S. Cl. .............................. 395/600; 364/DIG. 1; 364/282.1; 364/282.4
[58] Field of Search .......... 395/600, DIG. 1, DIG. 2, 395/155, 160, 161

[56] References Cited

U.S. PATENT DOCUMENTS

| | | | |
|---|---|---|---|
| 3,624,616 | 11/1971 | Patel | 364/200 |
| 4,497,020 | 1/1985 | Gilligan | 364/200 |
| 4,648,036 | 3/1987 | Gallant | 364/300 |
| 4,814,978 | 3/1989 | Dennis | 364/200 |
| 4,823,310 | 4/1989 | Grand | 364/900 |
| 4,827,423 | 5/1989 | Beasley et al. | 364/468 |
| 4,841,435 | 6/1989 | Papenburg | 364/200 |
| 4,932,026 | 6/1990 | Dev et al. | 370/94.1 |
| 4,959,776 | 9/1990 | Deerfield et al. | 364/200 |
| 4,989,141 | 1/1991 | Lyons et al. | 364/408 |
| 5,008,853 | 4/1991 | Bly et al. | 395/153 |
| 5,113,393 | 5/1992 | Kam et al. | 370/94.1 |
| 5,123,104 | 6/1992 | Levine et al. | 395/600 |
| 5,133,068 | 7/1992 | Crus et al. | 395/600 |
| 5,133,075 | 6/1992 | Risch | 395/800 |
| 5,148,533 | 9/1992 | Joyce et al. | 395/425 |

OTHER PUBLICATIONS

TM/1 Relational Spreadsheet Release 3.0 of Sinper Corporation (User's Manual), 1987, Sinper Corporation, Warrenton, N.J.

SQL Server Language Reference by Ashton-Tate/Microsoft, 1989, Ashton-Tate, Torrance, Calif. pp. 1–100 to 1–105, 1–137 to 1–139, 1–158 to 1–159.

*Primary Examiner*—Paul V. Kulik
*Assistant Examiner*—John C. Loomis
*Attorney, Agent, or Firm*—Lerner, David, Littenberg, Krumholz & Mentlik

[57] ABSTRACT

A system and method for connecting electronic spreadsheets through a local area network are provided in which the spreadsheet programs are separate from the databases upon which they operate. The databases are multidimensional with each cell or datum identified by a unique set of element identifiers. The system and method allow users to create and control their own spreadsheet models while working with one, consistent pool of information. Changes in data effected by one user are reflected in the spreadsheets of all users, thereby guaranteeing consistent results for an entire work group at all times. Access restriction parameters for each user for each element of each dimension of the database also are provided. Multiple levels of consolidation values for each dimension of the database are calculated and updated automatically.

20 Claims, 5 Drawing Sheets

FIG. 3

|  | RENT | PAYROLL | SUPPLIES | UTILITIES |
|---|---|---|---|---|
| USER 1 | F | F | F | R |
| USER 2 | F | F | N | F |
| USER 3 | R | F | N | F |
| USER 4 | N | R | F | R | a BUDGET ITEM

FIG. 4

|  | JAN | FEB | NOV | DEC |
|---|---|---|---|---|
| USER 1 | F | F | R | N |
| USER 2 | N | RE | F | F |
| USER 3 | F | F | F | F |
| USER 4 | N | N | R | N | b MONTH

FIG. 5

|  | R+D | MANUF. | SALES | ADMIN. |
|---|---|---|---|---|
| USER 1 | F | F | RE | R |
| USER 2 | F | F | F | F |
| USER 3 | F | F | F | N |
| USER 4 | R | F | R | N | c DEPARTMENT

FIG. 6

|  | CURRENT | FORECAST 1 | FORECAST 2 | FORECAST 3 |
|---|---|---|---|---|
| USER 1 | R | R | F | N |
| USER 2 | F | F | F | F |
| USER 3 | F | F | RE | F |
| USER 4 | N | F | F | R | d YEAR

CURRENT YEAR

DATA AND TABLE SET UP

FIG. 8
MANUFACTURING DEPT.

|  | JAN | FEB | | NOV | DEC | YEARLY AVERAGE |
|---|---|---|---|---|---|---|
| RENT | 500 | 600 | | 600 | ... | 530 |
| PAYROLL | 9000 | 9100 | | 9400 | ... | 1300 |
| SUPPLIES | 600 | 650 | | 740 | ... | 700 |
| UTILITIES | 700 | 350 | | 340 | ... | 400 |
| MONTHLY AVERAGE (ALL ITEMS) | 8000 | 500 | | 2770 | ... | 2733 |

PC1 (USER 1)

FIG. 9
PAYROLL

|  | JAN | FEB | | NOV | DEC | YEARLY AVERAGE |
|---|---|---|---|---|---|---|
| R+D | 7000 | 7000 | | 8000 | 8000 | 7500 |
| MANUF. | 9000 | 9400 | | 9400 | 9800 | 9300 |
| SALES | 750 | 800 | | 850 | 850 | 800 |
| ADMIN. | ... | ... | | ... | ... | ... |
| MONTHLY AVERAGE (ALL DEPTS) | 5000 | 8100 | | 4875 | 5013 | 4725 |

PC3 (USER 3)

DATA REQUEST

DATA MODIFICATION

SYSTEM AND METHOD FOR STORING AND RETRIEVING INFORMATION FROM A MULTIDIMENSIONAL ARRAY

BACKGROUND OF THE INVENTION

The present invention pertains to methods and apparatus for storing and retrieving information and, more particularly, to methods and apparatus for storing and retrieving information from a multidimensional array.

The use of electronic spreadsheets on personal computers marked the beginning of the "microcomputer revolution." Electronic spreadsheets make it possible for people in the business community to become productive on computers quickly, without having to become programmers. The row and column structure, or table format, of electronic spreadsheets gives users an easily understood means for comparing and contrasting numbers and other information.

The proliferation of electronic spreadsheets has caused several problems, however. Within many business entities, a plurality of spreadsheets are employed by a number of users, often working on related matters. Although the same data may be pertinent to some or all of these spreadsheets, these data are entered into, and updated within, each of the spreadsheets independently of each other. For example, an accountant in the financial department and a market analyst in the sales department are likely to use electronic spreadsheets which rely upon the same basic data. Since these data are entered and updated by each spreadsheet user independently, however, these data may be different and the modeling results produced by the spreadsheets inconsistent.

Present spreadsheet systems also do not allow two users to simultaneously work on the same electronic spreadsheet. Even if the personal computers of the various spreadsheet users are connected through a local area network, each spreadsheet, and the data and calculations which it contains, cannot be worked on or updated by two users at the same time.

Another deficiency of present electronic spreadsheet systems are that they are flat, or two-dimensional. Recently, a three-dimensional spreadsheet, known as LOTUS 1-2-3 ® Rel. 3.0, has been introduced. Business data, however, often have more than three dimensions. For example, the budget for a department in a large corporation may be structured with expense items as line items and months as column items. If the same structure were applied to all departments in the corporation, this two-dimensional format would require a third dimension. Months would comprise one axis or dimension, expense items a second axis or dimension and departments a third axis or dimension. If this same structure were applied to each of a number of subsidiaries of the corporation and for the current year and a number of forecasted years, the data would require five dimensions. Using present electronic spreadsheets, data for each dimension after the third dimension would require a new spreadsheet.

As spreadsheets become larger, another problem is presented. A budget for a company that lists, e.g., 25 expense items, for a 12-month period, for each of 10 departments, over 5 years, requires 15,000 cells simply to store the raw data. After the analyst enters these data, he or she must locate the data for use in calculations. Current spreadsheet systems provide no simple means for accomplishing this task because they require that the address of each element of the data be known before it can be retrieved. This problem is further exacerbated in three-dimensional spreadsheets which use cryptic cell references that are even more complex than those used in two-dimensional spreadsheets.

The capabilities of current electronic spreadsheets also are limited because they store both raw data and calculation instructions together. Even though two users may be modeling off the same raw data, therefore, two spreadsheets are required, each having the separate calculation instructions and all the raw data.

In many cases, it is desirable to restrict access to a portion of the data in the spreadsheet to some of the users to which the spreadsheet is accessible, e.g., restricting particular users from viewing or changing certain data. Although some electronic spreadsheets are capable of "locking out" certain users, this all or nothing approach is undesirable when only a small segment of the data requires restriction.

Electronic spreadsheets are particularly useful for budgeting, financial consolidation, financial planning, financial analysis, profit and loss reporting, sales analysis, market research, forecasting and other applications involving tabular data. In such applications, it often is desirable to consolidate figures to present, for example, monthly, quarterly and yearly averages for various line and column items. Although current electronic spreadsheets may provide some formulas for determining some of these values, these spreadsheets are limited in the range, flexibility and dimensional variety of consolidation figures available.

SUMMARY OF THE INVENTION

The present invention provides an electronic spreadsheet system and method in which the spreadsheets are connected through a local area network and in which the spreadsheet calculation models are separate from the databases upon which they operate. The system and method of the present invention allow users to create and control their own spreadsheet models while working with one, consistent pool of information. Changes in data effected by one user are reflected in real time in the spreadsheets of all users, thereby guaranteeing consistent results for the entire work group at all times. The system and method of the present invention are based upon the concept of sharing spreadsheet data, not the spreadsheets themselves.

In one aspect, the present invention comprises a method and apparatus for storing and retrieving information in which the data are stored in one or more multidimensional arrays. Each datum of each multidimensional array is uniquely identified by a set of element identifiers which includes one element identifier for each dimension of the array.

Users of the system select subarrays of data from the multidimensional array as the raw data for their spreadsheets. Subarrays are selected by specifying sets of element identifiers identifying the data to be included in each subarray. Each datum in each of the multidimensional subarrays is identified by the same element identifiers used to identify that datum in the multidimensional arrays. In this manner, all data throughout the system are consistently identified and easily located, regardless of their storage locations in the arrays, subarrays or spreadsheet models in which they are used.

If a user of one of the spreadsheets connected to the network updates data within the spreadsheet, the updated data are transmitted to the multidimensional array and other users of spreadsheets using these data receive a signal in real time informing them of a change in some or all of the data within their subarrays. These users then can request retransmission of their subarrays, with the updated data, from the multidimensional array to their spreadsheets. Alternatively, the updated data are transmitted automatically in real time to the other user's spreadsheets.

Preferably, the system and method of the present invention provide automatic consolidation of groups of data whose element identifiers differ only with respect to the same dimension. For example, in a multidimensional array in which one of the dimensions is "months," the system and method of the present invention automatically consolidate and store within the array quarterly and yearly averages for this dimension. If a datum upon which one or more of these consolidation values is based is changed, the affected consolidated values are recalculated automatically. Consolidation values are calculated using an hierarchical scheme, i.e., by sequentially calculating progressively higher levels of consolidation values in which the data for each subsequent level of consolidation values are the values in the immediately preceding level of consolidation values.

In an alternative embodiment, all consolidation values are identified as undefined and calculated only at the time they are selected by a user for a spreadsheet. Selected consolidation values then are defined (calculated) and retain this status unless any of the data upon which they depend are updated or changed. In that event, such calculated consolidation values are returned to the undefined status. Using this scheme, the processing resources of the system are conserved and dedicated to the function of calculating consolidation values only when necessary.

Preferably, in accordance with the present invention, the spreadsheet calculation models are provided separately from the data upon which they operate. Because of this independence, a number of analyses can be performed in the same or separate worksheets on the same core of data. By updating these data in the multidimensional array, the results of each spreadsheet using these data also are updated.

Because the raw data of the present invention are multidimensional and uniquely identified with respect to an array's dimensions, subarrays of data can be selected easily by "slicing" the data in an array along various dimensions. For example, in a five-dimensional array for which the first dimension is budget items, the second dimension is months, the third dimension is departments, the fourth dimension is years and the fifth dimension is divisions, a "slice" of data can show on a two-dimensional screen, budget items along one axis and months along the other axis for the budget for the current year of the manufacturing department of a division of a corporation. A second "parallel slice" of data through this same multidimensional array can depict the same axes for the sales department. On the other hand, a "perpendicular slice" of data through this same multidimensional array can show months along one axis and departments along the other axis for the payroll budget item for this division in the current year. There is no limit, other than the storage capacity of the system, to the amount of information that can be stored and retrieved in this tabular manner.

In accordance with another aspect of this invention, one or more tables of access restriction parameters are provided, each such table being associated with one dimension of the multidimensional array, and specifying, for each element identifier for that dimension, an access restriction parameter for each of the users of the array. Requests for access to the array include information specifying the identity of the user originating the request and a set of element identifiers identifying a datum within the array selected. A set of access restriction parameters pertaining to the request is created by determining, from the tables of access restriction parameters, the access restriction parameter, if any, for the specified user with respect to each element identifier in the request. The grant or denial of the access request is controlled in accordance with the access restriction parameters in this set of access restriction parameters. In one embodiment, this grant or denial is determined by selecting the most stringent access restriction parameter from the set of access restriction parameters pertaining to the request. The access restriction parameters preferably include a plurality of parameter types, each specifying different degrees of access to the elements of the array such as no access, read-only access, combined read and write access and reserve access (disallows writing except for certain users).

BRIEF DESCRIPTION OF THE DRAWINGS

FIGS. 3-6 are symbolic illustrations of access-restriction parameter tables for four users of the four-dimensional array of data illustrated in FIG. 2;

FIGS. 8 and 9 are symbolic illustrations of the two-dimensional slices of data depicted in FIG. 7.

DETAILED DESCRIPTION OF THE PREFERRED EMBODIMENTS

Figure 1:
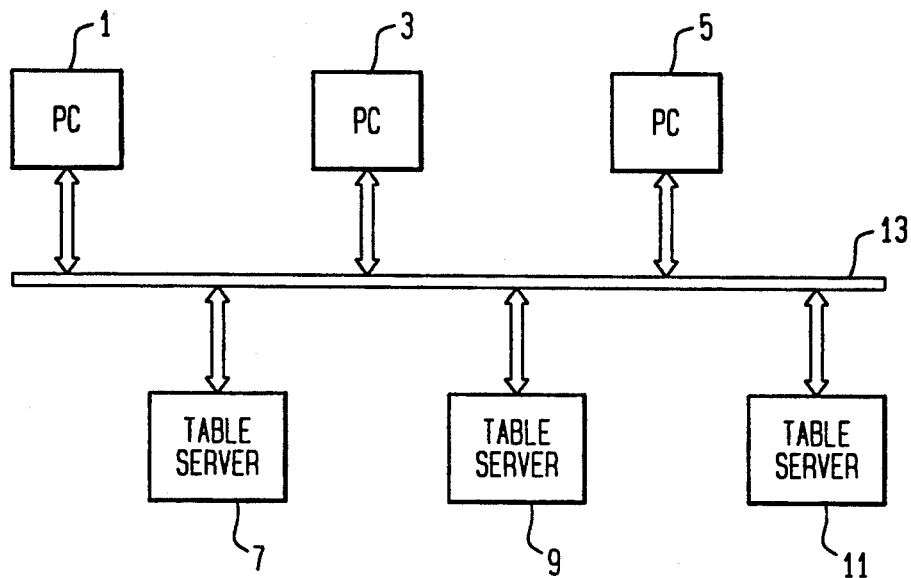
FIG. 1 is a functional block diagram of a system in accordance with the present invention.

FIG. 1 shows in functional block diagram form a computer-based system in accordance with the present invention. The components of this system include personal computers (PC's) 1, 3 and 5, and table servers 7, 9 and 11. Any number of personal computers and table servers can be included in the system. Each of these components is connected to a local area network 13 which enables the component to transmit data to, and receive data from, the other components of the network.

The personal computers 1, 3 and 5 comprise, in each case, the typical major components of a central processing unit, memory and input/output (I/O) circuits. The I/O circuits enable each computer to communicate information in appropriately structured format between the computer and various external devices (not shown) connected to it, such as one or more graphic display devices, e.g., a printer or CRT. The memory of each PC typically includes one or more application programs, such as, for example, spreadsheets, word processors, database managers, graphics programs and the like. An internal operating system, such as MS/DOS, also is included for controlling the various internal operations of the computer. A network operating system, such as NETBIOS, for controlling the transmission of data between the computer and other components on the network, also is stored in memory.

Table servers 7, 9 and 11 also are personal computers or work stations and contain the same major components as personal computers 1, 3, and 5. These computers, however, are dedicated to storing and transmitting tabular data to PC's 1, 3 and 5 in accordance with the present invention.

Figure 2:
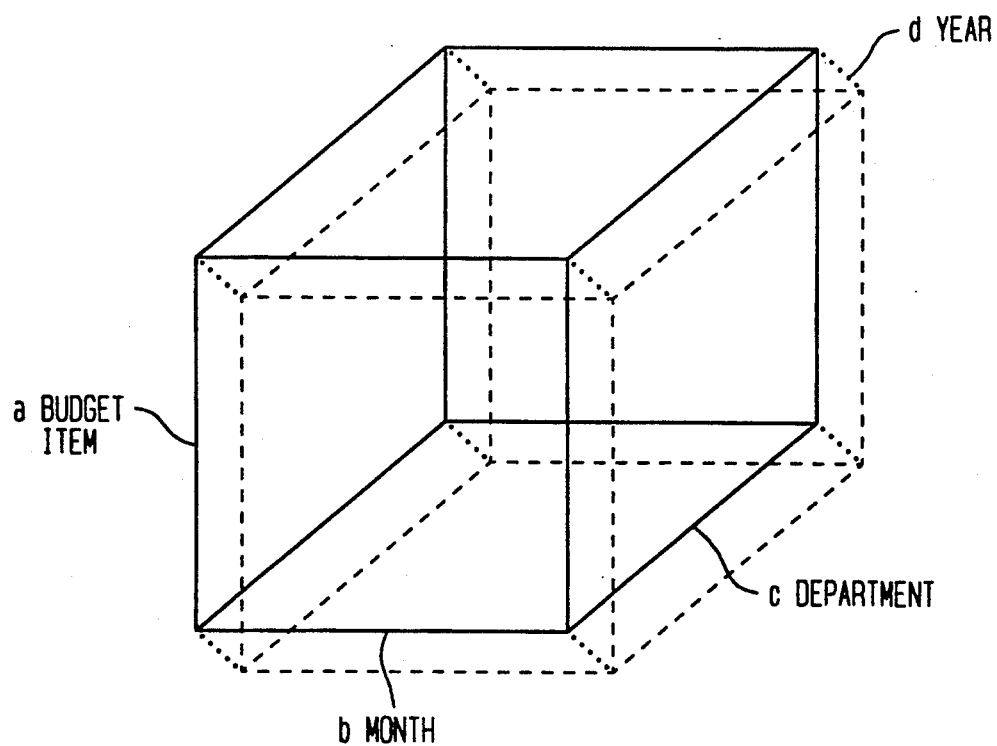
FIG. 2 is a perspective diagram illustrating the structure of data within a four-dimensional array of data in accordance with the present invention.

FIG. 2 illustrates the structure of a multidimensional array of data, in this case an array having four dimensions, stored in the memory of table servers 7, 9 or 11 in accordance with the present invention. Each table server can store one or more multidimensional arrays of data having this dimensional structure and any number of dimensions. Each datum within each multidimensional array and, therefore, each memory location dedicated to each such datum in table servers 7, 9 and 11, is uniquely identified by a set of element identifiers. Each element identifier of each such set corresponds to a "dimension," of the array, i.e., an axis of the array defining the structure, location and identity of data within it.

Since the array illustrated in FIG. 2 has four dimensions, each datum within it is defined and identified by four element identifiers, labeled a, b, c and d. This array, for the purpose of illustration, can be viewed as presenting the monthly budget of a corporation for each budget item for each department of the corporation over several years. These years include, for example, the current year and three future years, forecast years 1, 2 and 3. As shown in FIG. 2, the a, b, c and d dimensions of these data represent budget items, months, departments and years, respectively. The structure of three of these dimensions, a (budget items), b (months) and c (departments), can be viewed, as shown in FIG. 2, as a rectangular prism with the x, y and z dimensions of the prism corresponding to the a, b and c dimensions of the array. Each cellular location within this three-dimensional array represents a datum for the current year. In order to present corresponding data for the forecasted years, a fourth dimension of the array is required. This dimension, dimension d (years), is illustrated in FIG. 2 using dotted lines.

Figure 10:
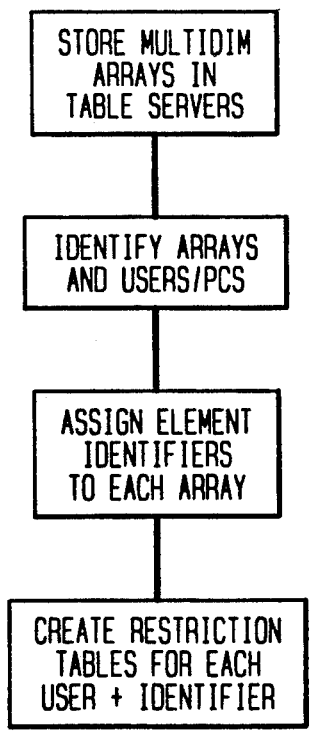
FIGS. 10, 11 and 12 are flow diagrams depicting, respectively, the steps executed by a system in accordance with the present invention for data and table set up, in response to a data request, and in response to data modification.

FIG. 10 is a flow diagram for the establishment of the multidimensional arrays and their associated element identifiers and restriction parameters (discussed below).

This organizational structure applies to all tabular data stored within table servers 7, 9 or 11. It can be expanded to include as much data, and as many dimensions to the data, as necessary. Thus, for example, if data corresponding to the budget for affiliated corporations were included, a fifth dimension (and a fifth element identifier) would be required. There is no limit, other than the storage capacity of the table servers 7, 9 and 11, to the amount of information that can be stored in this dimensional manner. Also, since each datum within each multidimensional array is identified by a unique set of element identifiers, the location and retrieval of any particular datum within the arrays are easily accomplished.

The data stored in table servers 7, 9 and 11 can be accessed by any of the personal computers connected to network 13, such as PC's 1, 3 and 5, using the network operating system stored within each network component, such as NETBIOS, and a standard network protocol. Programs used by all components on the network, such as those controlling table servers 7, 9 and 11 and the transmission of data between these servers and PC's 1, 3 and 5, are stored in each of the PC's and table servers. Various generally used spreadsheet programs are stored in PC's 1, 3 and 5. The raw data for these spreadsheets, however, are stored in table servers 7, 9 and 11, and the spreadsheet programs themselves comprise only calculation models for operating upon and displaying these data. Because of this independence, a number of analyses can be performed in the same or separate spreadsheets using the same core of data while keeping all users apprised of updates or changes in the data effected by any user.

Figure 11:
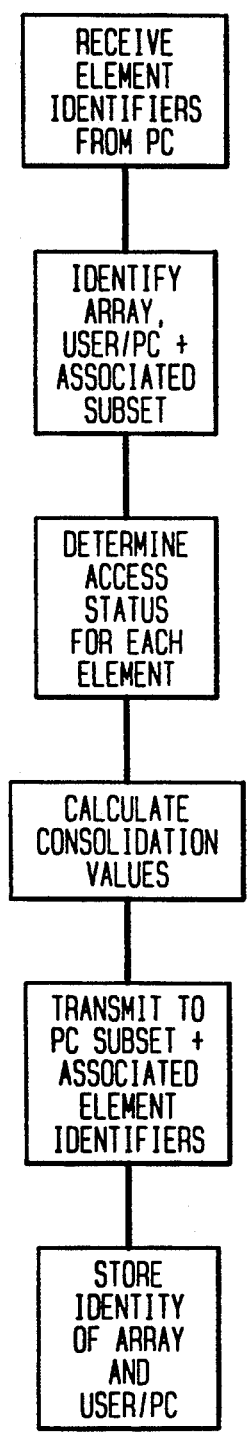

FIG. 11 is a flow diagram depicting the steps executed by a table server upon receipt of a request for data in a multidimensional array.

Figure 7:
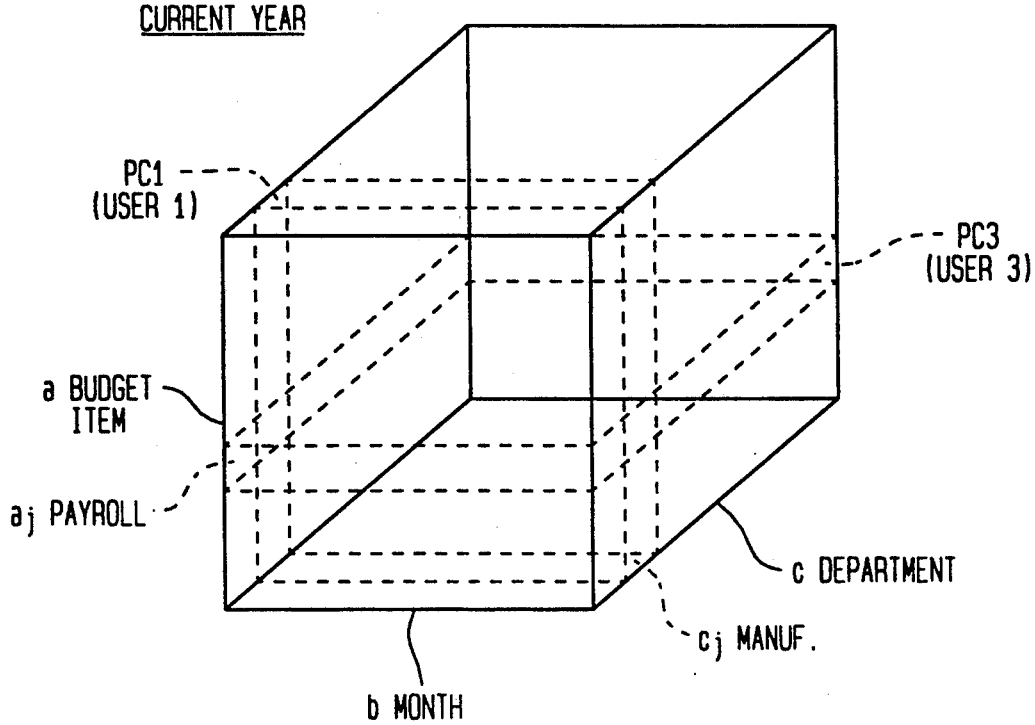
FIG. 7 is another perspective diagram illustrating three dimensions of the multidimensional array of data shown in FIG. 2 and further illustrating two user-selected "slices" of data through this array from which two-dimensional subarrays of data are composed.

A user, e.g., user 1, of one of the personal computers connected to the network, e.g., PC 1, seeking to use in a spreadsheet some of the data stored in the multidimensional array illustrated in FIG. 2, gains access to the table server storing this array, e.g., server 11, through his or her PC and network 13. After gaining access, user 1 instructs the transmission of a selected "slice" of data from the table server to the PC. For the purpose of illustration, this slice of data is illustrated in FIGS. 7 and 8 as a two-dimensional slice of budgeting information for a single department of the corporation, in this case the manufacturing department, for the current year. The instruction code controlling the selection and transmission of this slice of data from table server 11 to PC 1 identifies each datum within the slice, or subarray of the multidimensional array, by the set of element identifiers uniquely identifying that datum. Thus, in this case where the data is four-dimensional and identified by four element identifiers, a (budget items), b (months), c (departments), and d (years), the instruction code identifies the values for c and d which correspond to those for the manufacturing department and current year, respectively, and values for a and b which comprise all of the combinations of values for these element identifiers within the multidimensional array. In other words, if $n_1$, $n_2$, $n_3$ and $n_4$ are the number of elements in dimensions a, b, c and d, respectively, of the array and if c=2 for the manufacturing department and d=1 for the current year, the instruction code for this slice would identify all sets of element identifiers for which (a,b,c,d)=(i, j, 2, 1), where i=1 to $n_1$; and j=1 to $n_2$.

In order to facilitate access to the data, table servers 7, 9 and 11 assign to each dimension of each array, and to each element of each dimension of each array, stored within the servers a name corresponding to the nature of that dimension and element. For example, table server 11 can assign to dimensions a, b, c and d of the array illustrated in FIGS. 2 and 7 the names "budget items," "months," "departments" and "years," respectively, and further names to the individual elements of each of these dimensions. These names then can be used by the PC users as a shorthand way for selecting data from the array. For the "slice" of data selected by user 1 of PC illustrated in FIGS. 7 and 8, therefore, the selection request transmitted by user 1 simply could state, e.g., "all data" for "manufacturing department" and "current year."

At the same time that the user 1 of PC 1 is working in a spreadsheet model at his or her PC with the slice of data illustrated in FIGS. 7 and 8, a user e.g., user 3, of one of the other PC's associated with the network, e.g., PC 3, can select and use a different slice of data from the same multidimensional array, e.g., the slice of data identified as "PC 3" in FIGS. 7 and 9. In this case, the data selected provide the payroll budget for all departments of the corporation for the current year. As shown in FIG. 7, this slice of the data can be viewed in the three-dimensional array of FIG. 7 as a rectangular prism perpendicular to the rectangular prism defining the data transmitted to PC 1. Again, user 3 of PC 3 selects the slice of data in the same manner as user 1 of PC i.e., by transmitting instruction code identifying the sets of element identifiers identifying all of the data within the slice. As further shown in FIG. 7, a portion of the data selected by user 3 of PC 3 overlaps a portion of the data selected by user 1 of PC 1. These overlapping data correspond to the payroll budget for the manufacturing department for each month of the current year. As further described below, the system and method of the present invention insures that these overlapping data remain the same for each user.

FIGS. 8 and 9 illustrate the presentation of the two-dimensional slices of data selected by users 1 and 3, respectively, at their PC's (PC's 1 and 3). This presentation can occur on, e.g., a printer or CRT associated with these PC's. As shown by these figures, PC 1 displays each budget item for the manufacturing department for each month of the current year, and PC 3 displays the payroll budget for each department for each month of the current year. PC 1 displays budget items along the y axis and months along the x axis, and PC 3 displays departments along the y axis and months along the x axis.

Each of the table servers calculates a series of consolidation values for the data in each of the dimensions of each of the arrays that it stores. Such consolidation values can include, e.g., monthly averages for all budget items or departments, or quarterly or yearly averages for a single budget item or department. Such calculated consolidation values are illustrated in FIG. 8 along the bottom row of the table which displays the monthly average for all budget items in the manufacturing department for each month of the current year, and in the last column on the right which displays the yearly average for each budget item in the manufacturing department for the current year. In FIG. 9, calculated consolidation values are illustrated along the bottom row which displays the monthly average for the payroll budget for all departments for the current year, and in the last column on the right which displays the yearly average for the payroll budget for each department for the current year.

In order to conserve storage capacity within the table servers, each table server calculates each consolidation value only at the time the value is selected by a user for a subarray. Alternatively, each consolidation value for each multidimensional array can be calculated and stored by the table server along with the other data included within the array. Table servers 7, 9 and 11 can perform this function initially upon storing a multidimensional array and again whenever any of the data upon which a consolidation value depends are changed. Although this alternative scheme uses more memory within the table servers, it enhances the speed in which subarrays can be selected and transmitted from the table servers to the PC's.

In both embodiments, consolidation values are calculated using an hierarchical scheme, i.e., by sequentially calculating progressively higher levels of consolidation values for which the data for each subsequent level of consolidation values are the values in the immediately preceding level of consolidation values. For example, if a particular dimension includes quarterly and yearly averages, the table server first calculates the four quarterly averages from the uncalculated data within the array and then calculates the yearly average using only the values for the quarterly averages. Any number of consolidation values, and any number of levels of consolidation values, can be "rolled up" automatically along each dimension of the multidimensional arrays by the table servers in this manner.

In a second alternative embodiment, the table servers initially store, but do not calculate or "define," each consolidation value upon storing each multidimensional array. An undefined consolidation value is defined, or calculated, only at the time it is requested by a user. If any of the data upon which a defined consolidation value depends are changed, the value for that consolidation value again becomes undefined and is not recalculated again until requested by a user.

For example, if in the example discussed above in which quarterly and yearly consolidation values along one dimension are calculated, the table server initially stores an undefined value for all five of these consolidation values (four quarterly averages and one yearly average). If a user requests one of the quarterly averages, only that quarterly average is defined, or calculated, and a calculated value stored for its value. On the other hand, if the yearly average is requested (a second level of consolidation values), the table server first calculates all quarterly averages (the first level of consolidation values) and then uses these values to calculate the yearly average. If, for example, after calculating this yearly average, the raw datum for February is updated, the consolidation values for the first quarter and the yearly average are returned to undefined and are not again recalculated until one of these consolidation values is selected by a user. This third embodiment enhances the speed in which the table servers can deliver consolidation values to a user while conserving their processing resources.

Figure 12:
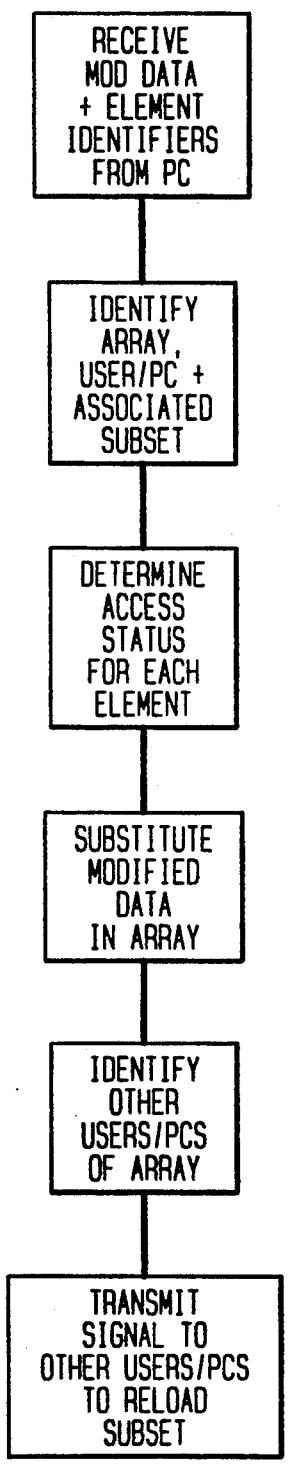

After the transmission of a slice of data from a multidimensional array to one of the PC's associated with network 13, e.g., PC 1, 3 or 5, the users of these PC's can insert these data into a spreadsheet program available on their PC. These spreadsheet programs can include TM/1 TM, a spreadsheet program provided by Sinper Corporation, assignee of the present application, or other commercially available spreadsheets, such as LOTUS 1-2-3 TM, available from Lotus Development Corporation. By separating these spreadsheet programs from the raw data upon which they operate, the present system and method offers a flexibility to users of the network unavailable in the past. In the past, each spreadsheet associated with a PC, even if part of an interactive PC network, was an independent entity which included all data and calculation models applicable to the data. Thus, any change or manipulation of the raw data, even if pertinent to other spreadsheet users, was not reflected in these other spreadsheets. Because of the disassociation of spreadsheet models from spreadsheet data, a number of analyses can be performed in the same or separate spreadsheets on the same core of data, and these analyses reflected on all affected data throughout the system. Thus, all spreadsheet users can be constantly updated with changes in the data pertinent to their work with them. FIG. 12 is a flow diagram depicting the steps executed by a table server upon the occurrence of any modification by a PC of data received from a multidimensional array.

The change or manipulation of any data from a multidimensional array by one of the PC's associated with the network is transmitted by the PC through the network back to the table server storing the multidimensional array providing that data. The table server then transmits a signal to all other PC's on the network using some or all of these data notifying the users of these PC's that data in their subarrays have changed. These users then can instruct the table server to retransmit their subarrays to their PC's. Alternatively, the table server can transmit the updated data automatically, with a notification signal, to the other PC's for insertion by these PC's into the subarrays.

This coordination of data between the PC's and the table servers is effected by identifying and locating each individual datum, regardless of where used or stored within the system, by its unique set of element identifiers. Data transmitted in a subarray from a table server to one or more of the PC's includes the sets of element identifiers within the multidimensional array identifying that data. The table server stores the identity of the multidimensional array providing the data and the identity of the PC's receiving the data. Alternatively, the table server stores the sets of element identifiers for the data and the identity of the PC's receiving the data. If data within a subarray are modified or updated by one of the PC's, the sets of element identifiers corresponding to the data, along with the modified values, are transmitted back to the table server. Using the element identifiers to identify the data, the table server substitutes the updated data into the multidimensional array and transmits a signal to all other PC's on the network using data from that array notifying the users of these PC's that data in the array have changed. Alternatively, if the table server stores the sets of element identifiers for the data transmitted to each PC and the identity of the PC's receiving the data, this signal identifies the changed data and is provided only to those PC's using some or all of the changed data.

In accordance with another aspect of this invention, access at each table server to each multidimensional array is restricted by assigning access restriction parameters to each element of each dimension of the array. These restriction parameters are used to restrict access by particular users to only those portions of the database which should not be seen or updated by these users. Other portions of the database, for which no sensitivity with respect to these users is present, is provided to them without restriction. The present invention's use of a set of element identifiers to identify each datum within the multidimensional array enables precise control of access to individual elements of the multidimensional array with respect to each user.

In accordance with this aspect of the invention, table servers 7, 9 and 11 create and store in memory a table of access restriction parameters for each dimension of each array stored within the server. These tables specify for each user and with respect to each element identifier for each dimension of each array, an access restriction parameter. FIGS. 3, 4, 5 and 6 illustrate tables of access restriction parameters for four users of the multidimensional arrays illustrated in FIGS. 2 and 7 for the dimensions of, respectively, a (budget items), b (months), c (departments), and d (years). The users of the multidimensional array are identified along the y-axis of these tables, and the element identifiers for each dimension are identified along the x-axis. One of a plurality of access restriction parameters is assigned to each cell of each table. These parameters include, e.g., full access to read and write data ("F"), access for reading data only, i.e., reading but no writing privileges ("R"), no access for either reading or writing ("N"), and reserve access ("RE"). Reserve access allows only a particular user, e.g., the user entering the restriction, to write with respect to the data.

In operation, a user of PC 1, 3 or 5 causes the PC to transmit over network 13 to table server 7, 9 or 11 sets of element identifiers identifying the data which he or she seeks transmitted to the PC for use in a spreadsheet model. For each datum selected, the table server compares the set of element identifiers identifying that datum with the tables of access restriction parameters for that user with respect to each element identifier in the set. Access to that datum is provided to the user in accordance with the set of access restriction parameters corresponding to the set of element identifiers.

For example, if user 1 seeks access to the payroll budget for the manufacturing department for the month of December of the current year, the access restriction parameters for this datum, as illustrated in FIGS. 3, 4, 5 and 6, are:

a (budget item): F
b (months): N
c (departments): F
d (years): R

The set of access restriction parameters controlling this request is, therefore, F, N, F, R. The table server transmits this datum to the PC at which user 1 is working, e.g., PC 1, in accordance with this set of access restriction parameters. Typically, this transmission is controlled by selecting the most stringent access restriction parameter from the set applicable to the request. In this case, that parameter is N, i.e., no access for either reading or writing.

Since user 1 has no access to data for the month of December, the table displayed at PC 1 for this user displays, as shown in FIG. 8, three dots in each cell for budget items for the month of December for the manufacturing department for the current year. Other indicators can be used for this purpose, and still other indicators can be used to notify the user of other access levels he or she may have with respect to other data displayed at his or her PC. For example, if a user has read only privileges with respect to a particular cell, this cell can be highlighted, and if both read and write privileges are applicable to the cell, normal lighting can be used.

As is evident from the above description, a relational spreadsheet method and system are provided for a plurality of users working from a plurality of personal computers connected through a local area network. By dedicating one or more of these computers as table servers for storing and transmitting data to each individual user, these data need be entered and updated only once and any modification of the data, regardless of where it occurs throughout the system, is reflected at the PC's of all users on the network. This system and method are enabled by the use of a database architecture comprising a plurality of dimensions for defining an array of data and in which each individual datum within the array is uniquely identified by a set of element identifiers comprising one element identifier for each dimension of the array. The system and method provide precise access/restriction privileges to individual users on the basis of individual cells of the multidimensional array, and calculate multiple levels of consolidation values along each dimension of the array. By assigning an access restriction parameter to each element of each dimension of the array and for each of the users of the system, and by comparing these parameters against each request from a user for the transmission of a particular datum for a subarray of a spreadsheet, individual cell restriction privileges, as opposed to all or nothing spreadsheet restriction privileges, are provided.

In view of the foregoing disclosure, numerous variations and combinations of the described system and method for storing and retrieving information are apparent. The foregoing description of the preferred embodiments, therefore, should be taken as illustrating, rather than limiting, the invention as defined in the following claims.

I claim:

1. A computer-implemented method of storing and retrieving information comprising the steps of:
   (a) storing in a computer-database data in the format of a multidimensional array wherein the relative position of each datum within said array is uniquely identified by a set of element identifiers, said set comprising one element identifier for each dimension of the array;
   (b) transmitting a plurality of multidimensional subarrays of data from said multidimensional array to a plurality of computers in response to requests transmitted from said computers, said subarrays of data comprising copies of data within said multidimensional array, said requests specifying the sets of element identifiers for the data selected for said subarrays, each datum in each of said multidimensional subarrays being identified by the same element identifiers as that for said datum in said multidimensional array;
   (c) changing a first transmitted datum within a first subarray of said subarrays from a first value to a second value in response to a command from a first computer of said computers receiving said first subarray;
   (d) transmitting a signal to a second computer of said computers receiving a second subarray of said subarrays informing said second computer of a change in the value of a datum within said array;
   (e) storing in said computer-database and within said multidimensional array at least a first calculated datum whose value is calculated from data within a group of data in said array whose element identifiers differ only with respect to the same dimension; and
   (f) establishing the value of said first calculated datum as an undefined value in response to a change in the data from which said first calculated datum is calculated and maintaining said value as an undefined value until the receipt of a request from one of said computers for the transmission of a subarray including said first calculated datum and, at such time, and in response to such request, automatically recalculating the value of said first calculated datum in accordance with said change and substituting said recalculated value for the value of said first calculated datum in said array.

2. A method as in claim 1, further comprising calculating and storing in said multidimensional array at least a second calculated datum whose value is calculated from the value of said first calculated datum.

3. A method as in claim 1, further comprising changing the value of said first transmitted datum within said second subarray from said first value to said second value.

4. A method as in claim 1, further comprising transmitting copies of data within said subarrays to a plurality of calculation models, stored in said computers separately from said subarrays, for performing calculations on the data in said subarrays.

5. A method as in claim 1, further comprising the steps of assigning a name to at least one datum within said array and transmitting said datum to one of said computers in response to a request from said computer specifying said name.

6. A method as in claim 1, further comprising transmitting a signal to said second computer receiving said second subarray identifying said first transmitted datum.

7. A computer-implemented method of storing and retrieving information comprising the steps of:
   (a) storing in a computer-database values in the format of a multidimensional array wherein each value is uniquely identified by a set of element identifiers, said set comprising one element identifier for each dimension of the array;
   (b) storing in said computer-database one or more tables of access restriction parameters, each such table being associated with one dimension of the array, and specifying, for each element identifier for that dimension, an access restriction parameter for each of a plurality of users of the values comprising said multidimensional array;
   (c) receiving from computers access requests for said plurality of users, each such access request specifying the identity of the user originating such access request and specifying a value by specifying a set of element identifiers for such value;
   (d) for each said access request, determining from said tables of access restriction parameters the access restriction parameter, if any, for the specified user with respect to each specified element identifier to thereby provide a set of access restriction parameters pertaining to such access request; and
   (e) controlling the grant of denial of each such access request according to the access restriction parameters in the set of access restriction parameters pertaining to such request.

8. A method as in claim 7, wherein said controlling step includes the step of selecting the most stringent access restriction parameter from the set of access restriction parameters pertaining to each such request and controlling access based upon such most restrictive parameter.

9. A method as in claim 8, wherein said access restriction parameters include a plurality of parameter types specifying different degrees of access.

10. A method as in claim 9, wherein said different degrees of access include no access, read-only access, combined read and write access, and reserve access.

11. A computer-system for storing and retrieving information comprising:
   (a) means for storing in a computer-database data in the format of a multidimensional array wherein the relative position of each datum within said array is uniquely identified by a set of element identifiers, said set comprising one element identifier for each dimension of the array;
   (b) means for transmitting a plurality of multidimensional subarrays of data from said multidimensional array to a plurality of computers in response to requests transmitted from said computers, said subarrays of data comprising copies of data within said multidimensional array, said requests specifying the sets of element identifiers for the data selected for said subarrays, each datum in each of said multidimensional subarrays being identified by the same element identifiers as that for said datum in said multidimensional array;
   (c) means for changing a first transmitted datum within a first subarray of said subarrays from a first value to a second value in response to a command from a first computer of said computers receiving said first subarray;
   (d) means for transmitting a signal to a second computer of said computers receiving a second subarray of said subarrays informing said second computer of a change in the value of a datum within said array;
   (e) means for storing in said computer-database and within said multidimensional array at least a first calculated datum whose value is calculated from data within a group of data whose element identifiers differ only with respect to the same dimension; and
   (f) means for establishing the value of said first calculated datum as an undefined value in response to a change in the data from which said first calculated datum is calculated and maintaining said value as an unidentified value until the receipt of a request from one of said computers for the transmission of a subarray including said first calculated datum, and for automatically recalculating, at such time, and in response to such request, the value of said first calculated datum in accordance with said change and substituting said recalculated value for the value of said first calculated datum in said array.

12. A system as in claim 11, further comprising means for calculating and storing in said multidimensional array at least a second calculated datum whose value is calculated from the value of said first calculated datum.

13. A system as in claim 11, further comprising means for changing the value of said first transmitted datum within said second subarray from said first value to said second value.

14. A system as in claim 11, further comprising means for transmitting copies of data within said subarrays to a plurality of calculation models stored in said computers, separately from said subarrays, for performing calculations on the data in said subarrays.

15. A system as in claim 11, further comprising means for assigning a name to at least one datum within said array and for transmitting said datum to one of said computers in response to a request from said computer specifying said name.

16. A system as in claim 11, further comprising means for transmitting a signal to said second computer receiving said second subarray identifying said first transmitted datum.

17. A computer-system for storing and retrieving information comprising:
   (a) means for storing in a computer-database values in the format of a multidimensional array wherein each value is uniquely identified by a set of element identifiers, said set comprising one element identifier for each dimension of the array;
   (b) means for storing in said computer-database one or more tables of access restriction parameters, each such table being associated with one dimension of the array, and for specifying, for each element identifier for that dimension, an access restriction parameter for each of a plurality of users of the values comprising said multidimensional array;
   (c) means for receiving from computers access requests for said plurality of users, each such access request specifying the identity of the user originating such access request and specifying a value by specifying a set of element identifiers for such value;
   (d) means for determining from said tables of access restriction parameters, for each of said requests, the access restriction parameter, if any, for the specified user with respect to each specified element identifier and for providing a set of access restriction parameters pertaining to such access request; and
   (e) means for controlling the grant or denial of each such access request according to the access restriction parameters in the set of access restriction parameters pertaining to such request.

18. A system as in claim 17, wherein said means for controlling includes means for selecting the most stringent access restriction parameters from the set of access restriction parameters pertaining to said request and for controlling access based upon such most restrictive parameter.

19. A system as in claim 18, wherein said access restriction parameters include a plurality of parameter types specifying different degrees of access.

20. A system as in claim 19, wherein said different degrees of access include no access, read-only access, combined read and write access, and reserve access.

* * * * *